US012432600B2

(12) United States Patent
Vaishnavi et al.

(10) Patent No.: US 12,432,600 B2
(45) Date of Patent: Sep. 30, 2025

(54) DISABLING ANALYTICS INFORMATION OF A NETWORK ANALYTICS FUNCTION

(71) Applicant: Lenovo (Singapore) Pte. Ltd., New Tech Park (SG)

(72) Inventors: Ishan Vaishnavi, Munich (DE); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 42 days.

(21) Appl. No.: 18/023,645

(22) PCT Filed: Aug. 26, 2021

(86) PCT No.: PCT/IB2021/057836
§ 371 (c)(1),
(2) Date: Feb. 27, 2023

(87) PCT Pub. No.: WO2022/043915
PCT Pub. Date: Mar. 3, 2022

(65) Prior Publication Data
US 2023/0276285 A1 Aug. 31, 2023

Related U.S. Application Data

(60) Provisional application No. 63/070,378, filed on Aug. 26, 2020.

(51) Int. Cl.
*H04W 24/10* (2009.01)
(52) U.S. Cl.
CPC .................. *H04W 24/10* (2013.01)
(58) Field of Classification Search
CPC ...................................................... H04W 24/10
See application file for complete search history.

(56) References Cited

U.S. PATENT DOCUMENTS

2019/0253912 A1\* 8/2019 Yao ..................... H04W 24/10
2019/0334796 A1\* 10/2019 Chou ..................... H04L 41/40
(Continued)

FOREIGN PATENT DOCUMENTS

WO    2020098951 A1    5/2020
WO    2020147926 A1    7/2020

OTHER PUBLICATIONS

PCT/IB2021/057836, "Notification of the International Search Report and the Written Opinion of the International Searching Authority, or the Declaration", International Searching Authority, Nov. 19, 2021, pp. 1-15.

(Continued)

*Primary Examiner* — Azizul Choudhury
(74) *Attorney, Agent, or Firm* — Kunzler Bean & Adamson

(57) ABSTRACT

Apparatuses, methods, and systems are disclosed for disabling analytics information of a network analytics function. One method includes transmitting, from an operation and management system, information indicating to disable analytics information of a network analytics function from use by at least one network function that is subscribed to the analytics information. The information indicating to disable the analytics information of the network analytics function includes: instructions corresponding to the network data analytics function; instructions corresponding to the at least one network function; a data identifier based on the analytics information; an analytics information type corresponding to the analytics information; an identifier or a type of the analytics information; a time interval or time window corresponding to the analytics information; instructions corresponding to a network slice instance; instructions corresponding to a single network slice selection assistance (Continued)

information; and/or instructions corresponding to a network slice subnet instance.

18 Claims, 10 Drawing Sheets

(56) References Cited

U.S. PATENT DOCUMENTS

| | | | |
|---|---|---|---|
| 2021/0105638 A1* | 4/2021 | Al-Kanani | H04L 41/142 |
| 2021/0351993 A1* | 11/2021 | Puente Pestaña | H04L 41/046 |
| 2022/0292398 A1* | 9/2022 | Norrman | H04L 41/28 |

OTHER PUBLICATIONS

Lenovo et al., "Rel17 CR 28.535 Add use case for temporarily disabling NWDAF", 3GPP TSG SA WG5 Meeting 134-e S5-206277, Nov. 16-25, 2020, pp. 1-3.

3GPP, "3rd Generation Partnership Project; Technical Specification Group Services and System Aspects; Architecture enhancements for 5G System (5GS) to support network data analytics services (Release 16)", 3GPP TS 23.288 V16.4.0, Jul. 2020, pp. 1-66.

3GPP, "3rd Generation Partnership Project; Technical Specification Group Services and System Aspects; Management and orchestration; Performance assurance (Release 16)", 3GPP TS 28.550 V16.5.0, Jul. 2020, pp. 1-116.

3GPP, "3rd Generation Partnership Project; Technical Specification Group Services and System Aspects; Management and orchestration of networks and network slicing; Performance Management (PM); Stage 2 and stage 3 (Release 15)", 3GPP TS 28.551 V0.2.0, May 2018, pp. 1-33.

* cited by examiner

1000

Begin

1002 — Transmit Capability Information Indicating The Ability To Disable Analytics Information Of A Network Analytics Function From Use By At Least One Network Function That Is Subscribed To The Analytics Information; Wherein The Information Indicating To Disable The Analytics Information Of The Network Analytics Function Comprises: Instructions Corresponding To The Network Data Analytics Function; Instructions Corresponding To The At Least One Network Function; A Data Identifier Based On The Analytics Information; An Identifier Of The Analytics Information Or An Identifier Of A Type Of The Analytics Information; An Analytics Information Type Corresponding To The Analytics Information; A Time Interval Or Time Window Corresponding To The Analytics Information; Instructions Corresponding To A Network Slice Instance; Instructions Corresponding To A Single Network Slice Selection Assistance Information; Instructions Corresponding To A Network Slice Subnet Instance; Or Some Combination Thereof End

FIG. 10

DISABLING ANALYTICS INFORMATION OF A NETWORK ANALYTICS FUNCTION

CROSS-REFERENCE TO RELATED APPLICATIONS

This application claims priority to U.S. patent application Ser. No. 63/070,378 entitled "APPARATUSES, METHODS, AND SYSTEMS FOR OAM DISABLING CONTROL PLANE ANALYTICS INFO" and filed on Aug. 26, 2020 for Ishan Vaishnavi, which is incorporated herein by reference in its entirety.

FIELD

The subject matter disclosed herein relates generally to wireless communications and more particularly relates to disabling analytics information of a network analytics function.

BACKGROUND

In certain wireless communications networks, analytics information may be provided to a device. However, it may not be desirable for the device to use the analytics information.

BRIEF SUMMARY

Methods for disabling analytics information of a network analytics function are disclosed. Apparatuses and systems also perform the functions of the methods. One embodiment of a method includes transmitting, from an operation and management system, information indicating to disable analytics information of a network analytics function from use by at least one network function that is subscribed to the analytics information. The information indicating to disable the analytics information of the network analytics function includes: instructions corresponding to the network data analytics function; instructions corresponding to the at least one network function; a data identifier based on the analytics information; an analytics information type corresponding to the analytics information; an identifier of the analytics information or an identifier of a type of the analytics information; a time interval or time window corresponding to the analytics information; instructions corresponding to a network slice instance; instructions corresponding to a single network slice selection assistance information; instructions corresponding to a network slice subnet instance; or some combination thereof.

One apparatus for disabling analytics information of a network analytics function includes an operation and management system. In some embodiments, the apparatus includes a transmitter that transmits information indicating to disable analytics information of a network analytics function from use by at least one network function that is subscribed to the analytics information. The information indicating to disable the analytics information of the network analytics function includes: instructions corresponding to the network data analytics function; instructions corresponding to the at least one network function; a data identifier based on the analytics information; an analytics information type corresponding to the analytics information; an identifier of the analytics information or an identifier of a type of the analytics information; a time interval or time window corresponding to the analytics information; instructions corresponding to a network slice instance; instructions corresponding to a single network slice selection assistance information; instructions corresponding to a network slice subnet instance; or some combination thereof.

Another embodiment of a method for disabling analytics information of a network analytics function includes transmitting, from a fifth generation core network, capability information indicating the ability to disable analytics information of a network analytics function from use by at least one network function that is subscribed to the analytics information. The information indicating to disable the analytics information of the network analytics function includes: instructions corresponding to the network data analytics function; instructions corresponding to the at least one network function; a data identifier based on the analytics information; an analytics information type corresponding to the analytics information; an identifier of the analytics information or an identifier of a type of the analytics information; a time interval or time window corresponding to the analytics information; instructions corresponding to a network slice instance; instructions corresponding to a single network slice selection assistance information; instructions corresponding to a network slice subnet instance; or some combination thereof.

Another apparatus for disabling analytics information of a network analytics function includes a transmitter that transmits capability information indicating the ability to disable analytics information of a network analytics function from use by at least one network function that is subscribed to the analytics information. The information indicating to disable the analytics information of the network analytics function includes: instructions corresponding to the network data analytics function; instructions corresponding to the at least one network function; a data identifier based on the analytics information; an analytics information type corresponding to the analytics information; an identifier of the analytics information or an identifier of a type of the analytics information; a time interval or time window corresponding to the analytics information; instructions corresponding to a network slice instance; instructions corresponding to a single network slice selection assistance information; instructions corresponding to a network slice subnet instance; or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 10 is a flow chart diagram illustrating another embodiment of a method for disabling analytics information of a network analytics function.

DETAILED DESCRIPTION

Figure 1:
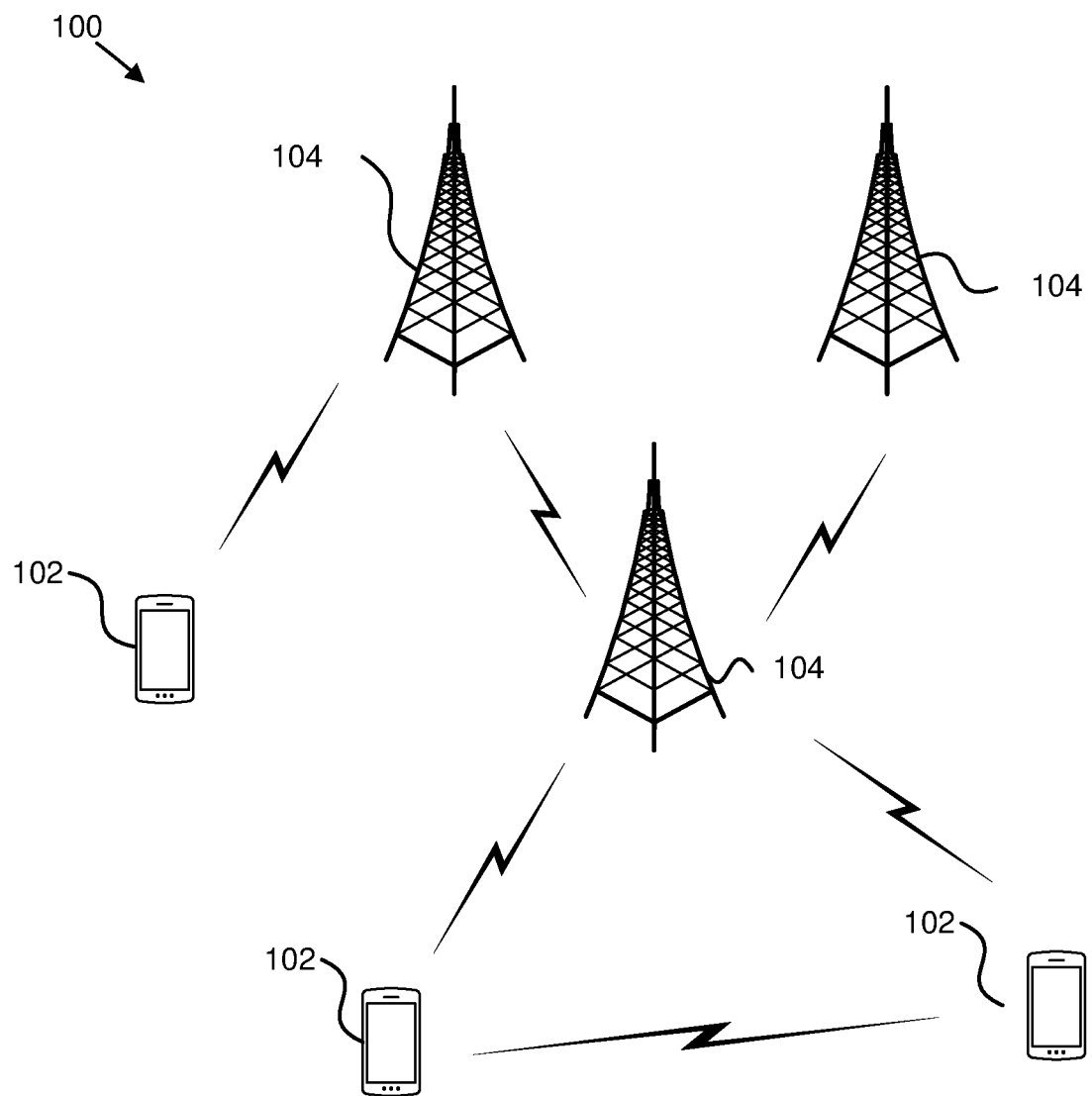
FIG. 1 is a schematic block diagram illustrating one embodiment of a wireless communication system for disabling analytics information of a network analytics function.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for disabling analytics information of a network analytics function. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may transmit, from an operation and management system, information indicating to disable analytics information of a network analytics function from use by at least one network function that is subscribed to the analytics information. The information indicating to disable the analytics information of the network analytics function includes: instructions corresponding to the network data analytics function; instructions corresponding to the at least one network function; a data identifier based on the analytics information; an analytics information type corresponding to the analytics information; an identifier of the analytics information or an identifier of a type of the analytics information; a time interval or time window corresponding to the analytics information; instructions corresponding to a network slice instance; instructions corresponding to a single network slice selection assistance information; instructions corresponding to a network slice subnet instance; or some combination thereof. Accordingly, the network unit 104 may be used for disabling analytics information of a network analytics function.

In certain embodiments, a network unit 104 may transmit, from a fifth generation core network, capability information indicating the ability to disable analytics information of a network analytics function from use by at least one network function that is subscribed to the analytics information. The information indicating to disable the analytics information of the network analytics function includes: instructions corresponding to the network data analytics function; instructions corresponding to the at least one network function; a data identifier based on the analytics information; an analytics information type corresponding to the analytics information; an identifier of the analytics information or an identifier of a type of the analytics information; a time interval or time window corresponding to the analytics information; instructions corresponding to a network slice instance; instructions corresponding to a single network slice selection assistance information; instructions corresponding to a network slice subnet instance; or some combination thereof. Accordingly, the network unit 104 may be used for disabling analytics information of a network analytics function.

Figure 2:
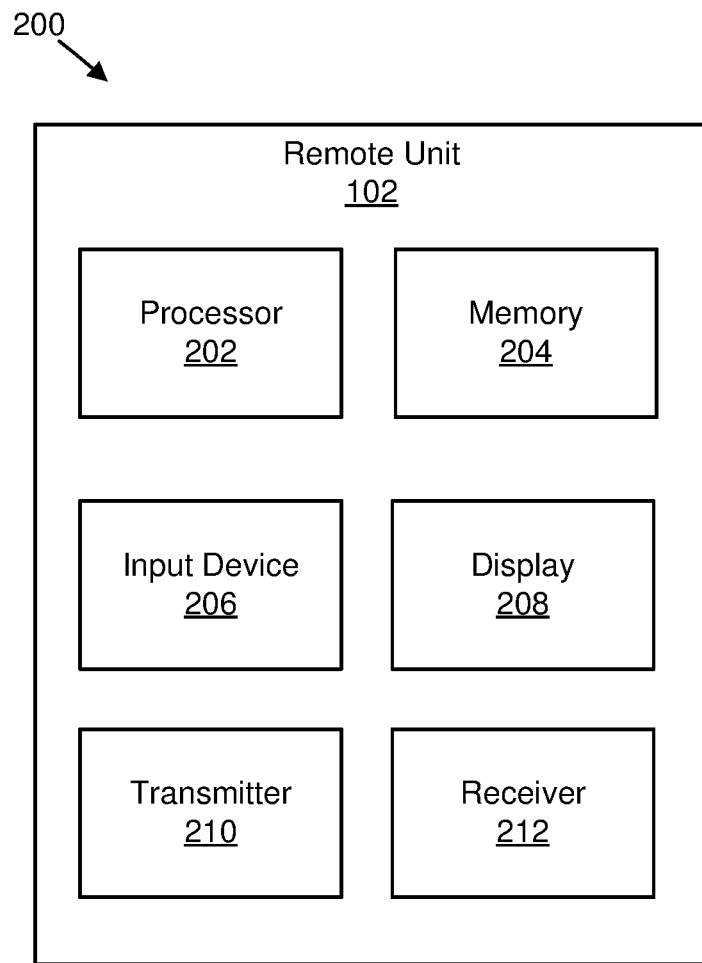
FIG. 2 is a schematic block diagram illustrating one embodiment of an apparatus that may be used for disabling analytics information of a network analytics function.

FIG. 2 depicts one embodiment of an apparatus 200 that may be used for disabling analytics information of a network analytics function. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
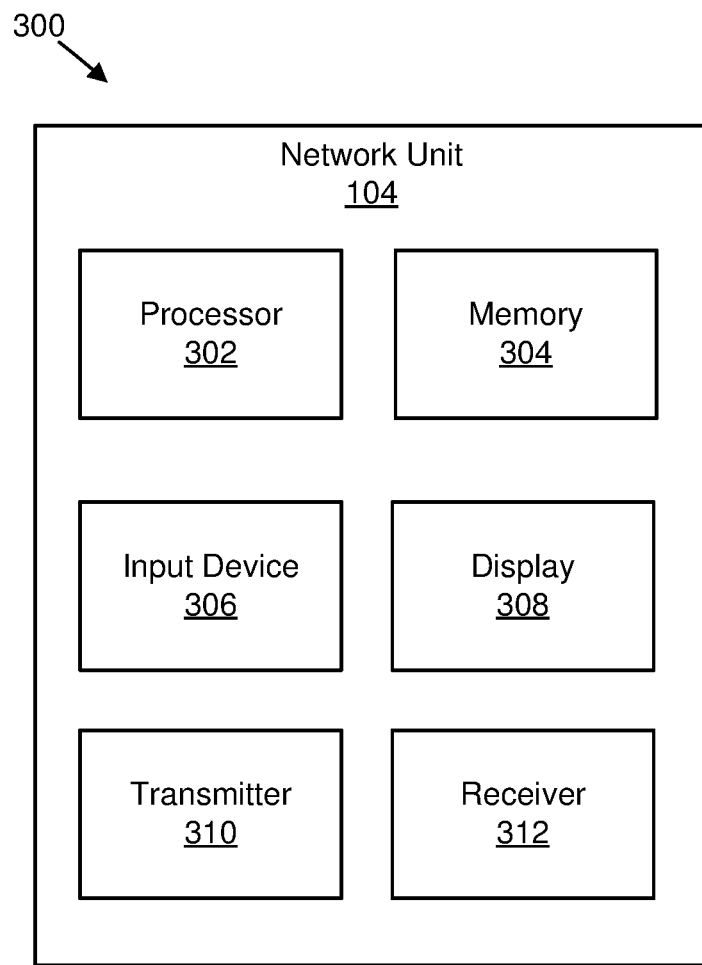
FIG. 3 is a schematic block diagram illustrating one embodiment of an apparatus that may be used for disabling analytics information of a network analytics function.

FIG. 3 depicts one embodiment of an apparatus 300 that may be used for disabling analytics information of a network analytics function. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 transmits information indicating to disable analytics information of a network analytics function from use by at least one network function that is subscribed to the analytics information. The information indicating to disable the analytics information of the network analytics function includes: instructions corresponding to the network data analytics function; instructions corresponding to the at least one network function; a data identifier based on the analytics information; an analytics information type corresponding to the analytics information; an identifier of the analytics information or an identifier of a type of the analytics information; a time interval or time window corresponding to the analytics information; instructions corresponding to a network slice instance; instructions corresponding to a single network slice selection assistance information; instructions corresponding to a network slice subnet instance; or some combination thereof.

In some embodiments, the transmitter 310 transmits capability information indicating the ability to disable analytics information of a network analytics function from use by at least one network function that is subscribed to the analytics information. The information indicating to disable the analytics information of the network analytics function includes: instructions corresponding to the network data analytics function; instructions corresponding to the at least one network function; a data identifier based on the analytics information; an analytics information type corresponding to the analytics information; an identifier of the analytics information or an identifier of a type of the analytics information; a time interval or time window corresponding to the analytics information; instructions corresponding to a network slice instance; instructions corresponding to a single network slice selection assistance information; instructions corresponding to a network slice subnet instance; or some combination thereof.

In certain embodiments, a network data analytics function ("NWDAF") provides analytics information to a core network and other consuming entities based on data collected from various sources. The consuming entities of the NWDAF analytics information may execute changes in the network or a user equipment ("UE") based on the analytics information they consume. The NWDAF may be unaware if some other entity (e.g., an operations and management ("OAM") entity) decides to modify the network, a network slice (e.g., subnet) instance, a network function ("NF"), or any other managed entity. In such configurations, consuming entities may continue to operate on incorrect analytics information generated by the NWDAF.

As described herein, an OAM in a management plan ("MP") may directly invalidate NWDAF analytics insights in a fifth generation ("5G") system. In some embodiments, the output of the NWDAF may be disabled.

Figure 4:
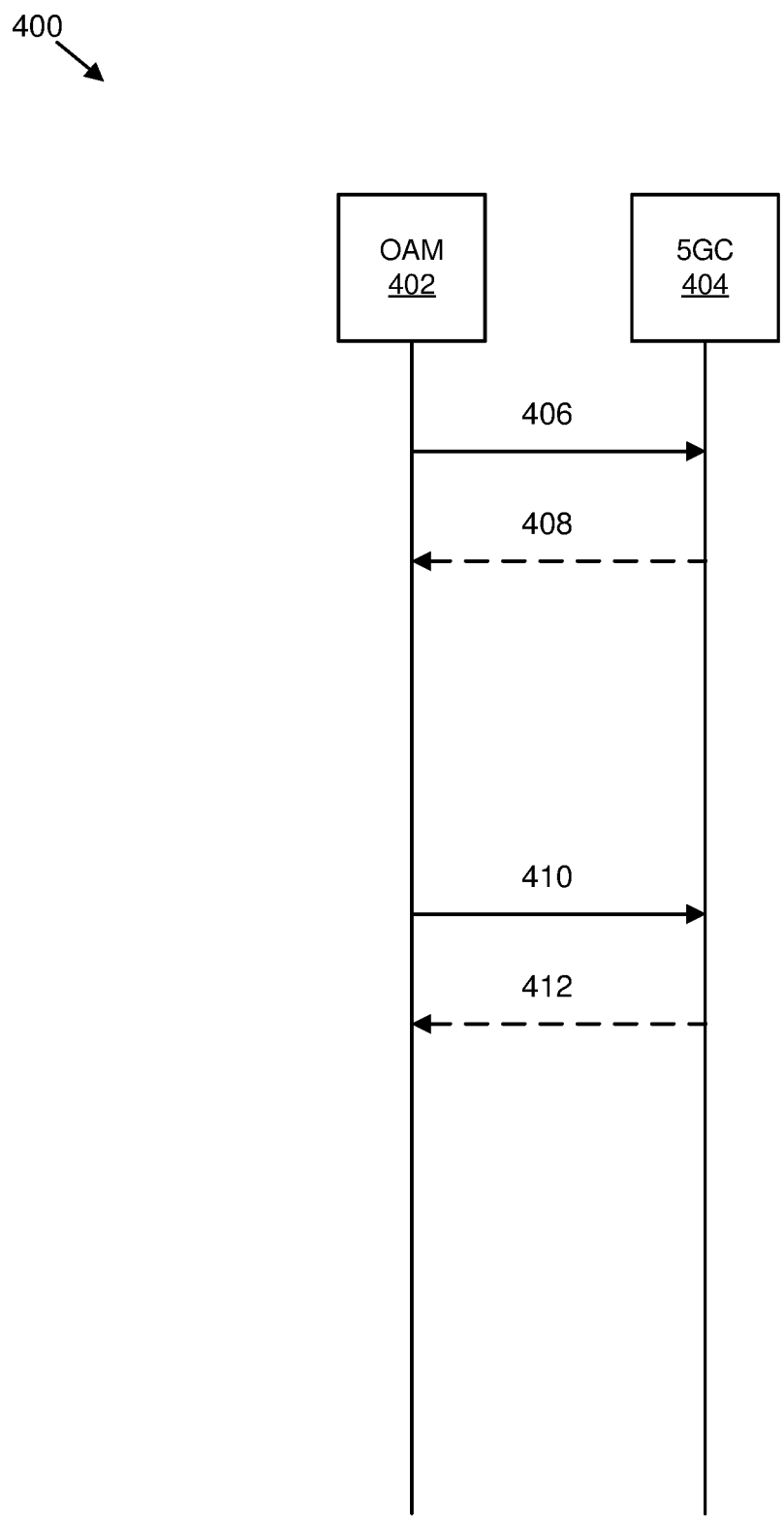
FIG. 4 is a schematic block diagram illustrating one embodiment of communications in a system for disabling NWDAF analytics information.

In various embodiments, an OAM may disable NWDAF analytics information in a 5G system as shown in FIG. 4.

FIG. 4 is a schematic block diagram illustrating one embodiment of communications in a system 400 for disabling NWDAF analytics information. The system 400 includes an OAM 402 and a 5G core network ("5GC") 404. As may be appreciated each of the communications described may include one or more communications.

In a first communication 406, a request from a management function in the OAM 402 may be made to disable the validity of certain analytics information from a set of NWDAF instances in a 5G system ("5GS"). The request may include: 1) identifiers of NWDAF instances that are affected; 2) identifiers of data, data sources, or data storage (e.g., all analytics information based on these may be invalidated); 3) a time for disabling devices and/or functions; 4) a resetting of some instances (e.g., completely)—resetting implies all learning is discarded and the NWDAF must start as a newly installed instance; 5) disabling an identified NWDAFs permanently; and/or 6) an additional filter for which disabling is valid such as such as a network slice instance ("NSI"), a network slice subnet instance ("NSSI"), a NF, network slice selection assistance information ("NSSAI"), an analytics information type, analytics information identifier ("ID"), a UE, a group of UEs, a service area, an application ID, and/or a coverage area.

In an optional second communication 408, the 5GC 404 may send an acknowledgement indicating success or failure to the OAM 402.

In a third communication 410, there may be a request from a management function in the OAM 402 to enable analytics information from a set of NWDAF instances in the 5GS. These instances may be previously disabled instances. Elements included in the first communication 406 request may be used here for enabling the analytics information, but may be different than in the first communication 406.

In an optional fourth communication 412, the 5GC 404 may send an acknowledgement indicating success or failure to the OAM 402.

It should be noted that any management function (e.g., as an implementation of the management service) in the OAM 402 may issue the disable request to the 5GC 404. These management functions may include: 1) a management function implementing a management data analytics service ("MDAS")—the MDAS producer or a management data analytics function ("MDAF"); 2) management functions implementing provisioning services (e.g., provisioning service producer); and/or 3) management functions implementing decision related services (e.g., decision service producer).

Moreover, the implementation in the 5GC 404 may vary in various ways. For example, the 5GC 404 may: 1) disable at a producing NWDAF; 2) disable at a consuming NF; and/or 3) disable in an intermediate service bus, communication channel, and/or a new radio function ("NRF") (e.g., disabling the communication between the NWDAF and the consuming NF).

In a first embodiment, an MDAS in an OAM (e.g., MP) disables a first NWDAF instance. The MDAS may do this if it expects to provide management analytics insights that will likely trigger modification of the entities related to the first NWDAF instance analytics ID X1.

Figure 5:
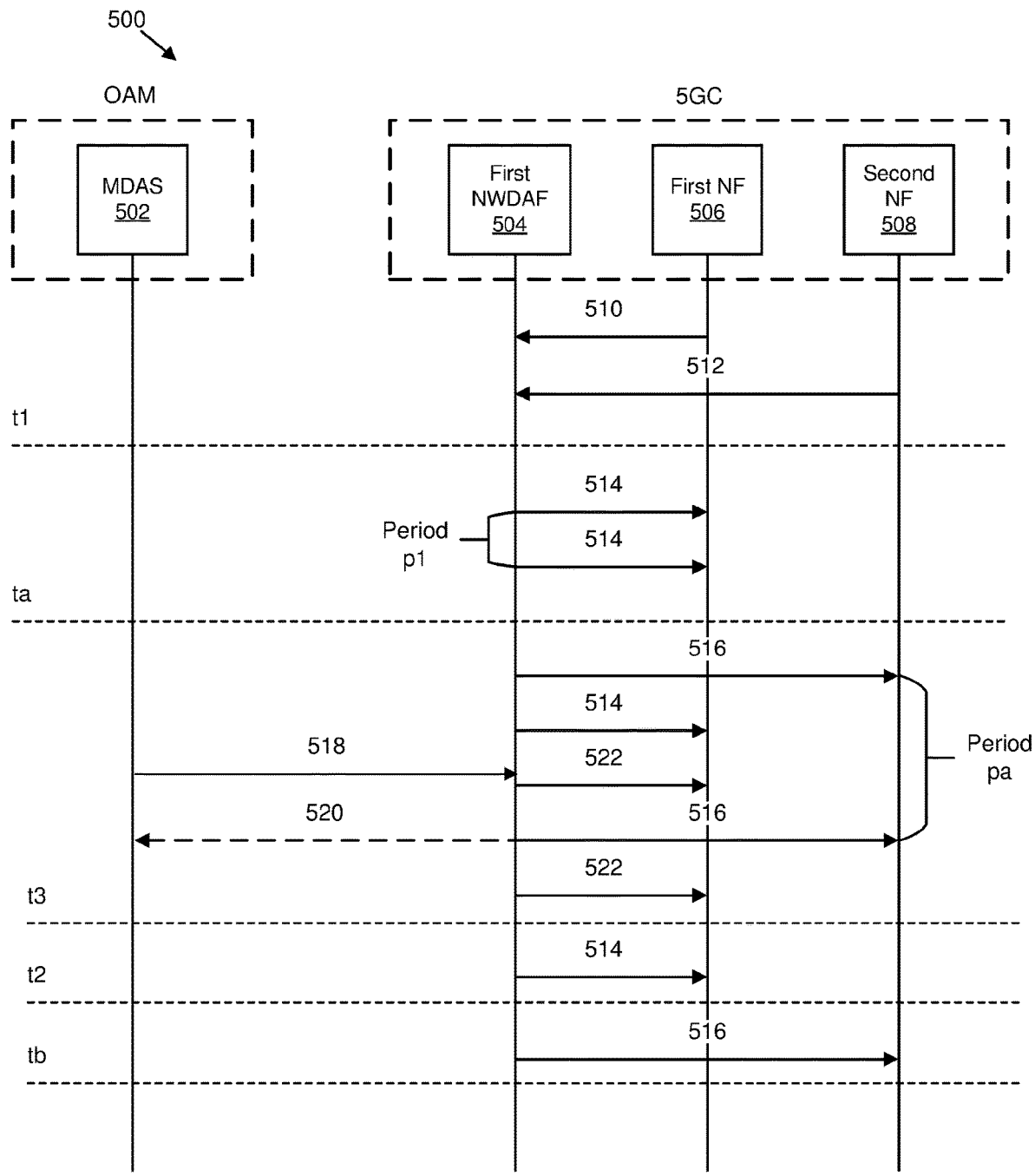
FIG. 5 is a schematic block diagram illustrating another embodiment of communications in a system for disabling NWDAF analytics information.

FIG. 5 is a schematic block diagram illustrating another embodiment of communications in a system 500 for disabling NWDAF analytics information according to the first embodiment. The system 500 includes a MDAS 502 in an OAM, and a first NWDAF instance 504 (NWDAF1), a first NF 506 (NF1), and a second NF 508 (NF2) in a 5GC. As may be appreciated each of the communications described may include one or more communications.

In a first communication 510, NF1 506 subscribes to analytics information ID X1 from time instance t1 to t2 with period p1.

In a second communication 512, NF2 508 subscribes to analytics info ID X2 from time instance ta to tb with period pa.

In third communications 514, based the subscription in step 510, NF1 506 receives the analytics information periodically (e.g., after period p1 again and again).

In fourth communications 516, based on the subscription in step 512, NF2 508 receives the analytics information periodically (e.g., after period pa again and again).

In a fifth communication 518, the MDAS 502 sends a disable request to NWDAF1 504 to disable analytics information X1 up to time t3 (e.g., in this embodiment).

In an optional sixth communication 520, a successful acknowledgment is received by the MDAS 502.

In seventh communications 522, due to the subscription in step 510, but disablement in step 518, an optional error or an analytics information X1 not available message is sent to NF1 506. In some embodiments, another option may could be that the NWDAF1 504 alerts the NF1 506 that respective analytics information has been disabled up to time t3.

It should be noted that after time t3 has passed and t2 has not, analytics information requested by NF1 506 may be provided.

In a second embodiment, an MDAS producer is replaced with a provisioning service producer and disabling of respective analytics information is performed at a NF. This may be useful if changes performed by an OAM may be relevant to the NF1 but not to the analytics information itself. In certain implementations of the second embodiment related to conflict management, multiple NFs may take divergent actions for the analytics information X1. In such implementations, the OAM may identify conflicts and disable one of the NFs acting on the analytics information.

Figure 6:
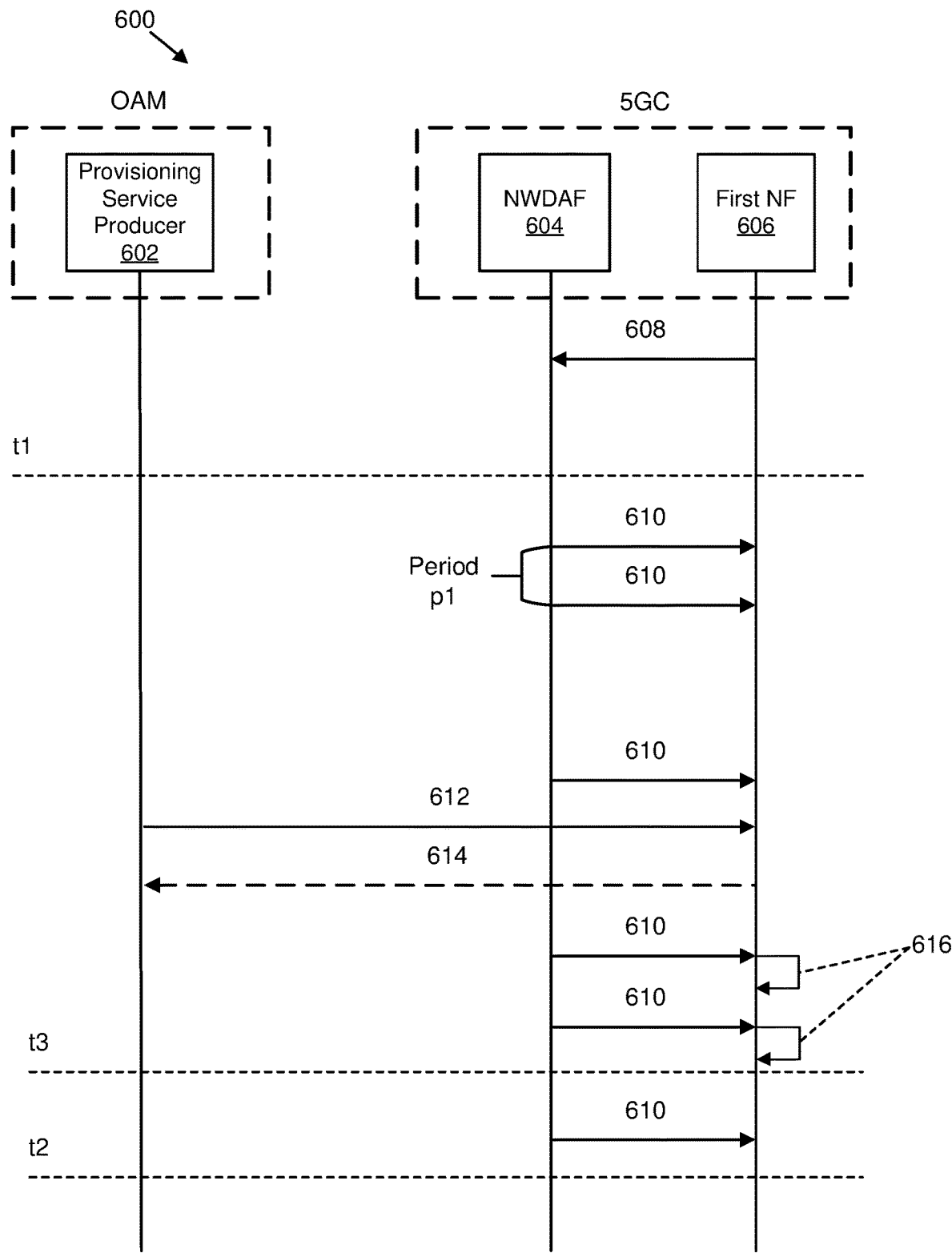
FIG. 6 is a schematic block diagram illustrating a further embodiment of communications in a system for disabling NWDAF analytics information.

FIG. 6 is a schematic block diagram illustrating a further embodiment of communications 600 in a system for disabling NWDAF analytics information according to the second embodiment. The system 500 includes a provisioning service producer 602 in an OAM, and an NWDAF instance 504 (NWDAF) and a first NF 606 (NF1) in a 5GC. As may be appreciated each of the communications described may include one or more communications.

In a first communication 608, NF1 606 subscribes to analytics information ID X1 from time instance t1 to t2 with period p1.

In second communications 610, based on subscription in step 608, NF1 606 receives the analytics information periodically (e.g., after period p1 again and again).

In a third communication 612, the provisioning service producer 602 sends a disable request to NF1 606 to disable providing analytics information X1 up to time t3 (e.g., in this embodiment).

In an optional fourth communication 614, a successful acknowledgment is received by the provisioning service producer 602.

It should be noted that, due to subscription in step 608 but disablement in step 612, analytics information in step 616 is ignored by the NF1 606.

In a third embodiment, a provisioning service producer disables analytics information forwarding at a communication channel between a NWDAF and a set of NFs in a CP. The communication channel may be implementation dependent and may be a service bus or another NF.

Figure 7:
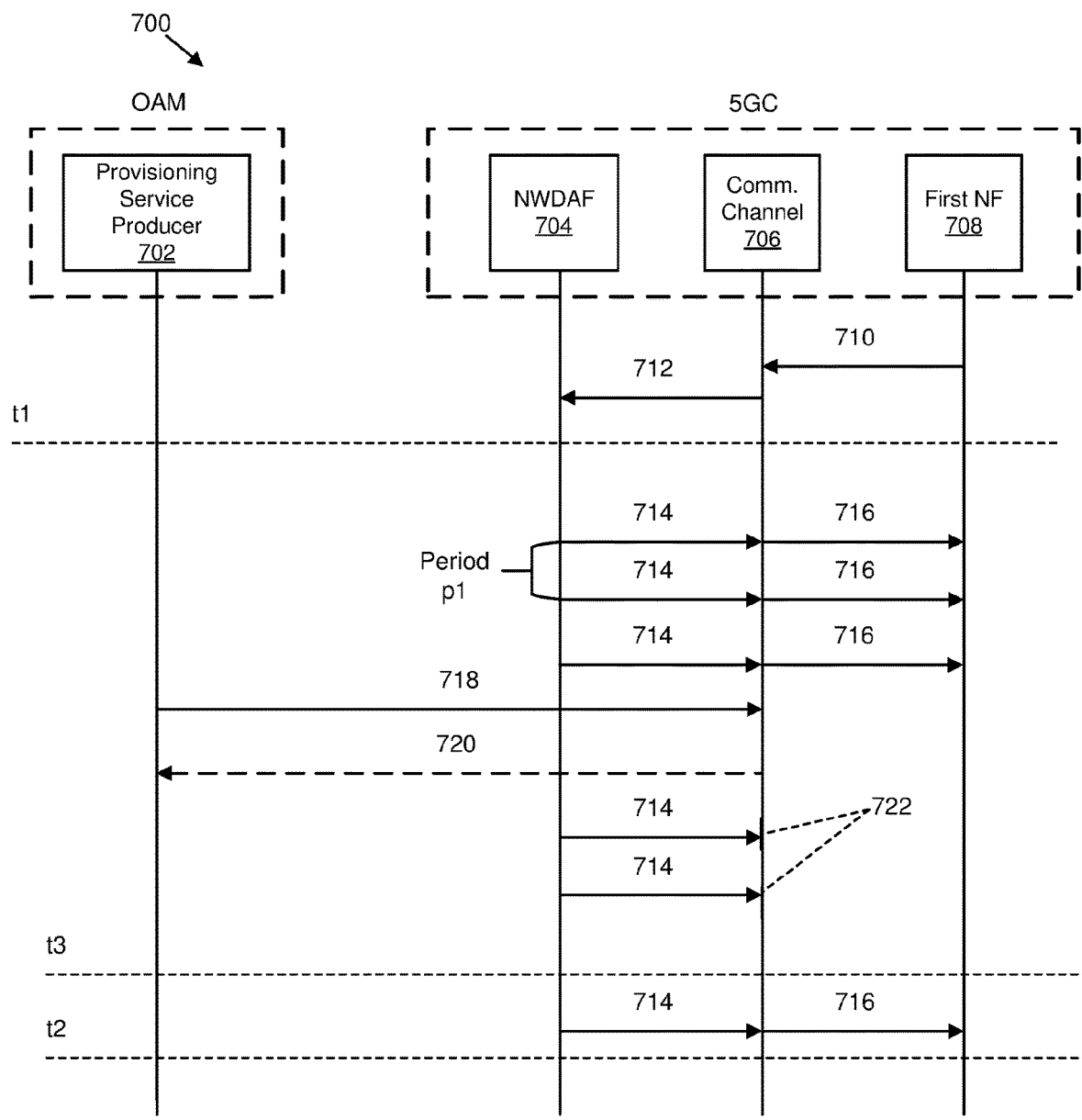
FIG. 7 is a schematic block diagram illustrating another embodiment of communications in a system for disabling NWDAF analytics information.

FIG. 7 is a schematic block diagram illustrating another embodiment of communications 700 in a system for disabling NWDAF analytics information according to the third embodiment. The system 700 includes a provisioning service producer 702 in an OAM, and an NWDAF instance 704 (NWDAF), a communication channel 706 (e.g., NRF or service bus), and a first NF 708 (NF1) in a 5GC. As may be appreciated each of the communications described may include one or more communications.

In a first communication 710, NF1 708 subscribes to analytics information ID X1 from time instance t1 to t2 with period p1 by sending a subscribe request to the communication channel 706.

In a second communication 712, the communication channel 706 forwards the subscribe request to the NWDAF instance 704 (step 712 may be optional as the communication channel 706 may already have subscribed to the requested analytics information).

In third communications 714 and fourth communications 716, based on subscription in steps 710 and/or 712, NF1 708 receives the analytics information periodically via the communication channel 706 (e.g., after period p1 again and again).

In a fifth communication 718, the provisioning service producer 702 sends a disable request to the communication channel 706 for analytics information X1 to be disabled (up to time t3) the analytics information X1 from reaching NF1 708 (e.g., in this embodiment).

In an optional sixth communication 720, successful acknowledgment is received by the provisioning service producer 702.

Based on the disabling request, the communication channel 706 receives 722 the analytics information X1 and it is not forwarded to NF1 708.

After time t3 is passed, the analytics information is forwarded to NF1 708.

In a fourth embodiment, a provisioning service producer identifies one or more data sources used by a NWDAF and requests analytics that may be based on that data to be invalidated for a certain time.

Figure 8:
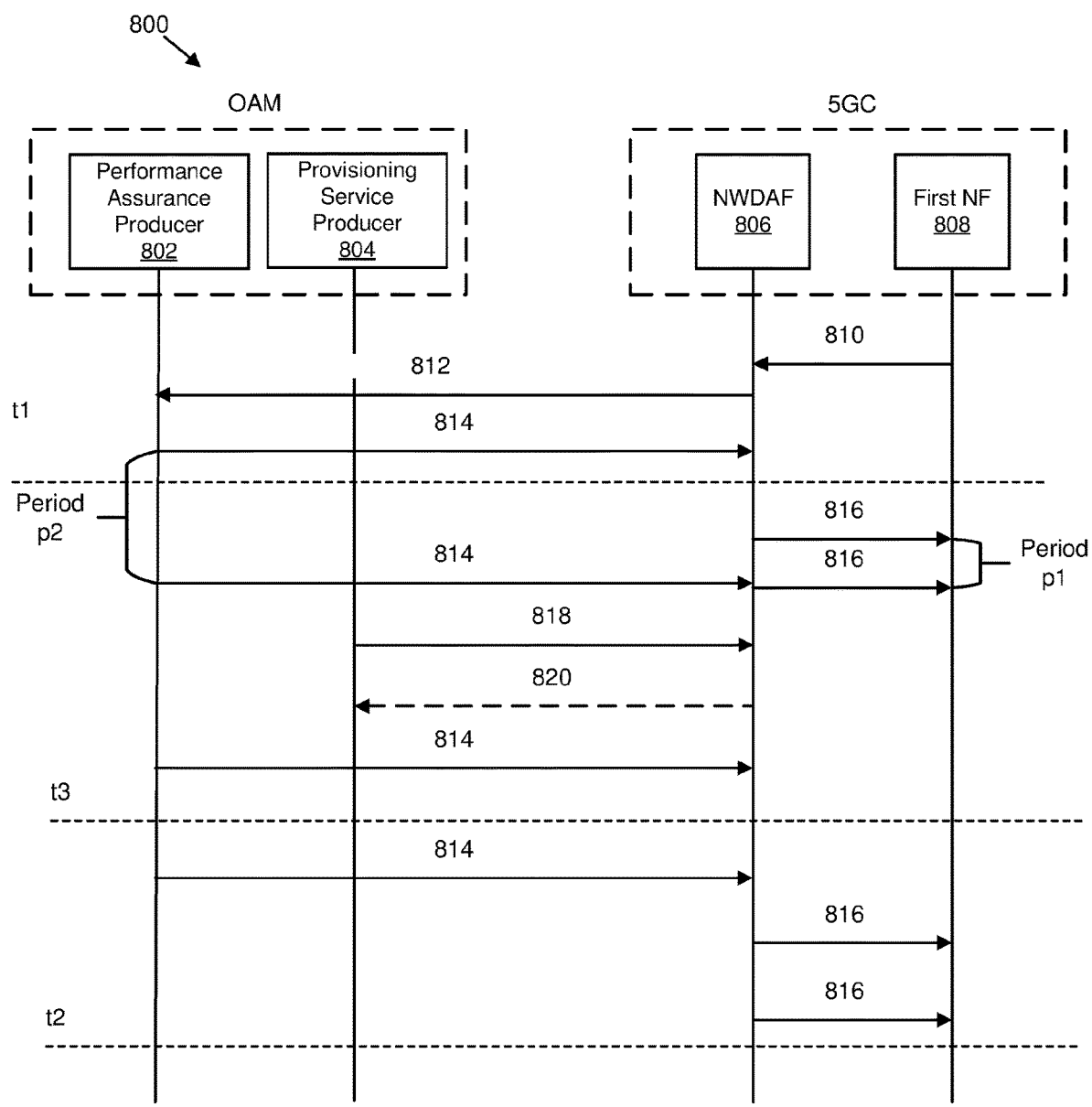
FIG. 8 is a schematic block diagram illustrating yet another embodiment of communications in a system for disabling NWDAF analytics information.

FIG. 8 is a schematic block diagram illustrating yet another embodiment of communications 800 in a system for disabling NWDAF analytics information according to the fourth embodiment. The system 800 includes a performance assurance producer 802 and a provisioning service producer 804 in an OAM, and an NWDAF instance 806 (NWDAF) and a first NF 808 (NF1) in a 5GC. As may be appreciated each of the communications described may include one or more communications.

In a first communication 810, NF1 808 subscribes to analytics information ID X1 from time instance t1 to t2 with period p1.

In a second communication 812, NWDAF 806 may request a subscription to additional data which may be required to support analytics X1 if it doesn't already have the required data (e.g., a subscription to MEs such as NFs).

In third communications 814, the requested data is periodically (e.g., with period p2) provided to the NWDAF 806. The requested data may be streamed or file based (e.g., after period p2 again and again).

In fourth communications 816, since time t1 has passed, NF1 808 receives the analytics information (e.g., after period p1 again and again).

In a fifth communication 818, the provisioning service producer 804 sends a disabling request to the NWDAF 806 to disable all analytics information (e.g., based on data source D1). D1 may be any identifier of the data or data source such as a fully qualified domain name ("FQDN") of a managed entity, a database identifier, or an identifier of a subscription request made to the performance assurance producer 802. This may cause the NWDAF 806 to not produce analytics information X1 because X1 is derived from data source D1 (e.g., from the time of receiving the request to t3). If X1 is derived from data other than D1 as identified by the provisioning service producer 804 then X1 may not be disabled.

In an optional sixth communication 820, the request may be acknowledged to the provisioning service producer 804. After time t3 has passed, the request of step 818 has expired and, since t2 has not yet passed, analytics information X1 is provided to NF1 808 again.

Figure 9:
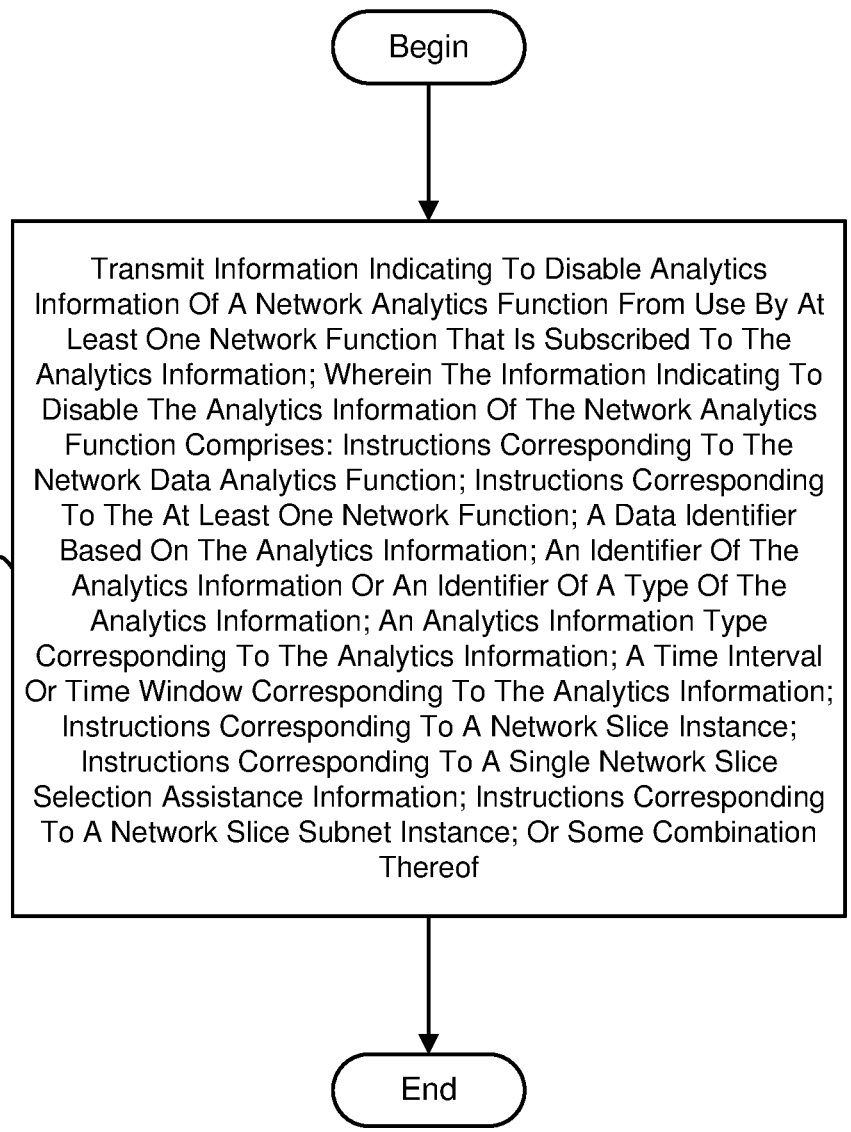
FIG. 9 is a flow chart diagram illustrating one embodiment of a method for disabling analytics information of a network analytics function.

FIG. 9 is a flow chart diagram illustrating one embodiment of a method 900 for disabling analytics information of a network analytics function. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes transmitting 902, from an operation and management system, information indicating to disable analytics information of a network analytics function from use by at least one network function that is subscribed to the analytics information. The information indicating to disable the analytics information of the network analytics function includes: instructions corresponding to the network data analytics function; instructions corresponding to the at least one network function; a data identifier based on the analytics information; an analytics information type corresponding to the analytics information; an identifier of the analytics information or an identifier of a type of the analytics information; a time interval or time window corresponding to the analytics information; instructions corresponding to a network slice instance; instructions corresponding to a single network slice selection assistance information; instructions corresponding to a network slice subnet instance; or some combination thereof.

In certain embodiments, the method 900 further comprises receiving feedback corresponding to the information indicating to disable the analytics information. In some embodiments, the information indicating to disable the analytics information of the network analytics function is processed by the network analytics function. In various embodiments, the information indicating to disable the analytics information of the network analytics function is processed by the at least one network function.

In one embodiment, the information indicating to disable the analytics information of the network analytics function is processed by a device configured to relay the analytics information between the network analytics function and the at least one network function. In certain embodiments, the method 900 further comprises receiving capability information from a fifth generation core network the ability to disable the analytics information of the network analytics function. In some embodiments, the capability information is received from a fifth generation core network. In various embodiments, the analytics information is disabled only for the time interval or the time window.

FIG. 10 is a flow chart diagram illustrating another embodiment of a method 1000 for disabling analytics information of a network analytics function. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes transmitting 1002, from a fifth generation core network, capability information indicating the ability to disable analytics information of a network analytics function from use by at least one network function that is subscribed to the analytics information. The information indicating to disable the analytics information of the network analytics function includes: instructions corresponding to the network data analytics function; instructions corresponding to the at least one network function; a data identifier based on the analytics information; an analytics information type corresponding to the analytics information; an identifier of the analytics information or an identifier of a type of the analytics information; a time interval or time window corresponding to the analytics information; instructions corresponding to a network slice instance; instructions corresponding to a single network slice selection assistance information; instructions corresponding to a network slice subnet instance; or some combination thereof.

In certain embodiments, the method 1000 further comprises receiving information indicating to disable the analytics information of the network analytics function from use by the at least one network function that is subscribed to the analytics information. In some embodiments, the method 1000 further comprises transmitting feedback corresponding to the information indicating to disable the analytics information.

In various embodiments, the information indicating to disable the analytics information of the network analytics function is transmitted from an operation and management system. In one embodiment, the analytics information is disabled only for the time interval or the time window.

In one embodiment, a method of an operation and management system comprises: transmitting information indicating to disable analytics information of a network analytics function from use by at least one network function that is subscribed to the analytics information; wherein the information indicating to disable the analytics information of the network analytics function comprises: instructions corresponding to the network data analytics function; instructions corresponding to the at least one network function; a data identifier based on the analytics information; an analytics information type corresponding to the analytics information; an identifier of the analytics information or an identifier of a type of the analytics information; a time interval or time window corresponding to the analytics information; instructions corresponding to a network slice instance; instructions corresponding to a single network slice selection assistance information; instructions corresponding to a network slice subnet instance; or some combination thereof.

In certain embodiments, the method further comprises receiving feedback corresponding to the information indicating to disable the analytics information.

In some embodiments, the information indicating to disable the analytics information of the network analytics function is processed by the network analytics function.

In various embodiments, the information indicating to disable the analytics information of the network analytics function is processed by the at least one network function.

In one embodiment, the information indicating to disable the analytics information of the network analytics function is processed by a device configured to relay the analytics information between the network analytics function and the at least one network function.

In certain embodiments, the method further comprises receiving capability information from a fifth generation core network the ability to disable the analytics information of the network analytics function.

In some embodiments, the capability information is received from a fifth generation core network.

In various embodiments, the analytics information is disabled only for the time interval or the time window.

In one embodiment, an apparatus comprises an operation and management system. The apparatus further comprises: a transmitter that transmits information indicating to disable analytics information of a network analytics function from use by at least one network function that is subscribed to the analytics information; wherein the information indicating to disable the analytics information of the network analytics function comprises: instructions corresponding to the network data analytics function; instructions corresponding to the at least one network function; a data identifier based on the analytics information; an analytics information type corresponding to the analytics information; an identifier of the analytics information or an identifier of a type of the analytics information; a time interval or time window corresponding to the analytics information; instructions corresponding to a network slice instance; instructions corresponding to a single network slice selection assistance information; instructions corresponding to a network slice subnet instance; or some combination thereof.

In certain embodiments, the apparatus further comprises a receiver that receives feedback corresponding to the information indicating to disable the analytics information.

In some embodiments, the information indicating to disable the analytics information of the network analytics function is processed by the network analytics function.

In various embodiments, the information indicating to disable the analytics information of the network analytics function is processed by the at least one network function.

In one embodiment, the information indicating to disable the analytics information of the network analytics function is processed by a device configured to relay the analytics information between the network analytics function and the at least one network function.

In certain embodiments, the apparatus further comprises a receiver that receives capability information from a fifth generation core network the ability to disable the analytics information of the network analytics function.

In some embodiments, the capability information is received from a fifth generation core network.

In various embodiments, the analytics information is disabled only for the time interval or the time window.

In one embodiment, a method of fifth generation core network comprises: transmitting capability information indicating the ability to disable analytics information of a network analytics function from use by at least one network function that is subscribed to the analytics information; wherein the information indicating to disable the analytics information of the network analytics function comprises: instructions corresponding to the network data analytics function; instructions corresponding to the at least one network function; a data identifier based on the analytics information; an analytics information type corresponding to the analytics information; an identifier of the analytics information or an identifier of a type of the analytics information; a time interval or time window corresponding to the analytics information; instructions corresponding to a network slice instance; instructions corresponding to a single network slice selection assistance information; instructions corresponding to a network slice subnet instance; or some combination thereof.

In certain embodiments, the method further comprises receiving information indicating to disable the analytics information of the network analytics function from use by the at least one network function that is subscribed to the analytics information.

In some embodiments, the method further comprises transmitting feedback corresponding to the information indicating to disable the analytics information.

In various embodiments, the information indicating to disable the analytics information of the network analytics function is transmitted from an operation and management system.

In one embodiment, the analytics information is disabled only for the time interval or the time window.

In one embodiment, an apparatus of a fifth generation core network comprises: a transmitter that transmits capability information indicating the ability to disable analytics information of a network analytics function from use by at least one network function that is subscribed to the analytics information; wherein the information indicating to disable the analytics information of the network analytics function comprises: instructions corresponding to the network data analytics function; instructions corresponding to the at least one network function; a data identifier based on the analytics information; an analytics information type corresponding to the analytics information; an identifier of the analytics information or an identifier of a type of the analytics information; a time interval or time window corresponding to the analytics information; instructions corresponding to a network slice instance; instructions corresponding to a single network slice selection assistance information; instructions corresponding to a network slice subnet instance; or some combination thereof.

In certain embodiments, the apparatus further comprises a receiver that receives information indicating to disable the analytics information of the network analytics function from use by the at least one network function that is subscribed to the analytics information.

In some embodiments, the transmitter transmits feedback corresponding to the information indicating to disable the analytics information.

In various embodiments, the information indicating to disable the analytics information of the network analytics function is transmitted from an operation and management system.

In one embodiment, the analytics information is disabled only for the time interval or the time window.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of performing an operation and management (OAM) function, the method comprising:
   determining, by the OAM function, to make a modification in a network that changes a requirement for analytics information from a network data analytics function (NWDAF); and
   in response to determining to make the modification, transmitting, from the OAM function, information to the NWDAF indicating to disable the analytics information of a network analytics function (NAF) from use by at least one network function that is subscribed to the analytics information;
   wherein the information indicating to disable the analytics information of the NAF comprises:
   instructions corresponding to the NWDAF;
   instructions corresponding to the at least one network function; and
   an identifier of the analytics information or an identifier of a type of the analytics information.

2. The method of claim 1, further comprising receiving feedback corresponding to the information indicating to disable the analytics information.

3. The method of claim 1, wherein the information indicating to disable the analytics information of the NAF is provided by the NAF.

4. The method of claim 1, wherein the information indicating to disable the analytics information of the NAF is provided by the at least one network function.

5. The method of claim 1, wherein the information indicating to disable the analytics information of the NAF is provided by a device between the NAF and the at least one network function.

6. The method of claim 1, further comprising receiving capability information for disabling the analytics information of the NAF.

7. The method of claim 6, wherein the capability information is received from a fifth generation (5G) network.

8. An apparatus for performing an operation and management (OAM) function, the apparatus comprising:
   at least one memory; and
   at least one processor coupled with the at least one memory and configured to cause the apparatus to:
   determine, by the OAM function, to make a modification in a network that changes a requirement for analytics information from a network data analytics function (NWDAF); and
   in response to determining to make the modification, transmit, from the OAM function, information to the NWDAF indicating to disable the analytics information of a network analytics function (NAF) from use by at least one network function that is subscribed to the analytics information;
   wherein the information indicating to disable the analytics information of the NAF comprises:
   instructions corresponding to the NWDAF;
   instructions corresponding to the at least one network function; and
   an identifier of the analytics information or an identifier of a type of the analytics information.

9. The apparatus of claim 8, wherein the instructions are further executable by the at least one processor to cause the apparatus to receive feedback corresponding to the information indicating to disable the analytics information.

10. The apparatus of claim 8, wherein the information indicating to disable the analytics information of the NAF is provided by the NAF.

11. The apparatus of claim 8, wherein the information indicating to disable the analytics information of the NAF is provided by the at least one network function.

12. The apparatus of claim 8, wherein the information indicating to disable the analytics information of the NAF is provided by a device configured to relay the analytics information between the NAF and the at least one network function.

13. The apparatus of claim 8, wherein the instructions are further executable by the at least one processor to cause the apparatus to receive capability information from a fifth generation (5G) core network for disabling the analytics information.

14. The apparatus of claim 8, wherein the analytics information is disabled for a time interval.

15. An apparatus comprising:
    at least one memory; and
    at least one processor coupled with the at least one memory and configured to cause the apparatus to:
    transmit, from a network data analytics function (NWDAF), capability information for disabling analytics information of a network analytics function (NAF) from use by at least one network function that is subscribed to the analytics information; and
    in response to an operation and management (OAM) function determining to make a modification in a network that changes a requirement for the analytics information, receive, by the NWDAF, information indicating to disable the analytics information of the NAF from use by the at least one network function that is subscribed to the analytics information;
    wherein the information indicating to disable the analytics information of the NAF comprises:
    instructions corresponding to the NWDAF;
    instructions corresponding to the at least one network function; and
    an analytics information type corresponding to the analytics information.

16. The apparatus of claim 15, wherein the instructions are further executable by the at least one processor to cause the apparatus to transmit feedback corresponding to the information indicating to disable the analytics information.

17. The apparatus of claim 1, wherein the information indicating to disable the analytics information of the NAF is transmitted from an operation and management system.

18. The apparatus of claim 15, wherein the analytics information is disabled for a time interval.

* * * * *